United States Patent
Shih et al.

(10) Patent No.: US 9,537,440 B2
(45) Date of Patent: Jan. 3, 2017

(54) CONTROL APPARATUS AND METHOD FOR CONTROLLING MOTOR

(71) Applicant: HON HAI PRECISION INDUSTRY CO., LTD., New Taipei (TW)

(72) Inventors: Ying-Che Shih, New Taipei (TW); Hsien-Hsi Juan, New Taipei (TW); Yi-Yuan Ting, New Taipei (TW); Fu-Xuan Ding, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 80 days.

(21) Appl. No.: 14/573,661

(22) Filed: Dec. 17, 2014

(65) Prior Publication Data

US 2015/0188477 A1    Jul. 2, 2015

(30) Foreign Application Priority Data

Dec. 31, 2013    (TW) .............................. 102149151 A

(51) Int. Cl.
*H02P 23/14*    (2006.01)
*H02P 6/16*    (2016.01)

(52) U.S. Cl.
CPC ................. *H02P 23/14* (2013.01); *H02P 6/16* (2013.01); *H02P 29/0241* (2016.02)

(58) Field of Classification Search
CPC ..................................................... H02P 23/14
USPC .......................................... 318/490, 34, 558
See application file for complete search history.

(56) References Cited

U.S. PATENT DOCUMENTS

| | | | |
|---|---|---|---|
| 6,191,550 B1* | 2/2001 | Yoshihara | B60L 3/0023 318/638 |
| 7,755,317 B2* | 7/2010 | Yu | 318/400.04 |
| 8,198,841 B2* | 6/2012 | Wang | G01D 5/24476 318/400.01 |

FOREIGN PATENT DOCUMENTS

| | | |
|---|---|---|
| EP | 1684412 A2 | 7/2006 |
| EP | 2527230 A1 | 11/2012 |

* cited by examiner

*Primary Examiner* — David S Luo
(74) *Attorney, Agent, or Firm* — Zhigang Ma

(57) ABSTRACT

A control apparatus for a motor having a rotor includes a resolver, a processor, a decoder, a sensor, and a motor driver. The resolver outputs waveforms sensed from a rotation of the rotor. The decoder generates an absolute angle signal and an incremental angle signal in response to the waveforms from the resolver and provides the absolute angle signal and the incremental angle signal to the processor. The sensor estimates a positioning angle of the rotor and provides an estimated angle signal in response to the positioning angle of the rotor to the processor. When one of the absolute angle signal, the incremental angle signal, and the estimated angle signal is transmitted to the processor, the processor executes a predetermined program associated with the respective absolute angle signal, the incremental angle signal, and the estimated angle signal, to control the motor driver to rotate the rotor.

13 Claims, 3 Drawing Sheets

CONTROL APPARATUS AND METHOD FOR CONTROLLING MOTOR

FIELD

The subject matter herein generally relates to control systems, and more particularly relates to a control apparatus and a control method for an electric motor of an electric or hybrid vehicle.

BACKGROUND

Electric motor systems in electric or hybrid vehicles often utilize a resolver coupled to an electric motor system to generate signals corresponding to a position and an electric motor's rotor speed. If the resolver fails, however, the electric motor system may not provide position and speed signals necessary to properly control the electric motor system.

BRIEF DESCRIPTION OF THE DRAWINGS

Implementations of the present technology will now be described, by way of example only, with reference to the attached figures.

DETAILED DESCRIPTION

Figure 1:
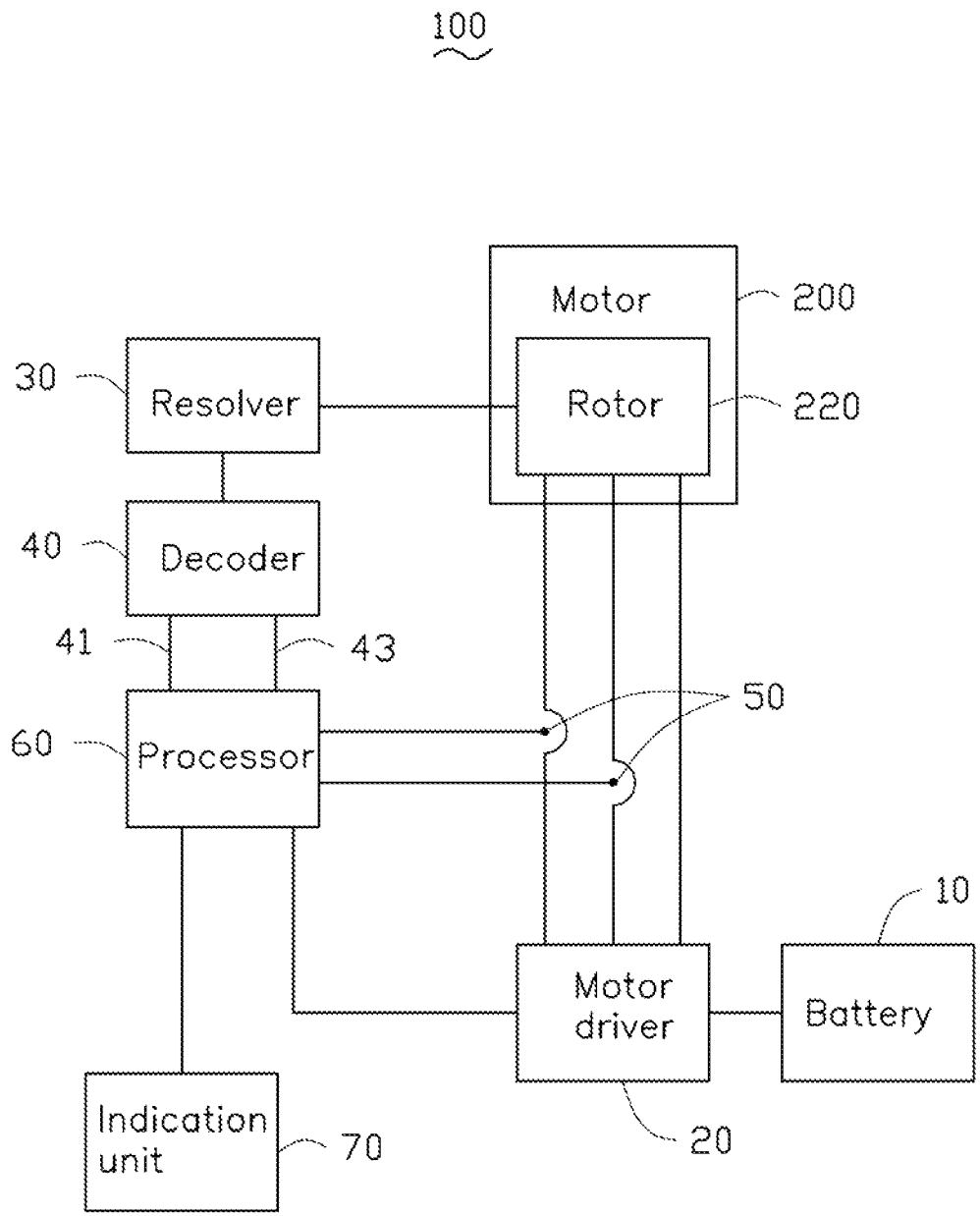
FIG. 1 is a block diagram of a control apparatus for a motor, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a control apparatus and a control method for a motor.

FIG. 1 illustrates an embodiment of a control apparatus 100, according to an exemplary embodiment. The control apparatus 100 is employed in electric or hybrid vehicles to control a motor 200 of the electric or hybrid vehicles. The motor 200 can be an electric motor, and includes a rotor 220 coupled to the control apparatus 100.

The control apparatus 100 includes a battery 10, a motor driver 20, a resolver 30, a decoder 40, a first cable 41, a second cable 43, a sensor 50, a processor 60, and an indication unit 70.

The battery 10 can be a rechargeable battery or other direct current (DC) source. The motor driver 20 is coupled between the battery 10 and the motor 200. Thus, the motor driver 20 can convert DC signals output from the battery 10 into a three phase alternating current (AC) signal to rotate the rotor 220.

The resolver 30 is mechanically coupled to the rotor 220 and outputs amplitude modulation sine and cosine waveforms sensed from a rotation of the rotor 220 based on the electromagnetic induction principle.

The decoder 40 is coupled to the resolver 30. The decoder 40 decodes the amplitude modulation sine and cosine waveforms to obtain a position of the rotor 220. That is, the decoder 40 generates an absolute angle signal and an incremental angle signal in response to the amplitude modulation sine and cosine waveforms from the resolver 30. The absolute angle signal indicates a current position of the rotor 220, and the incremental angle signal indicates a motion of the rotor 220 relative to a previous position of the rotor 220.

Additionally, the decoder 40 determines whether at least one of the resolver 30 and the decoder 40 is malfunctioning. If at least one of the resolver 30 and the decoder 40 malfunctions (such as a decoding malfunction), the decoder 40 outputs a first control signal. If both the resolver 30 and the decoder 40 do not malfunction, the decoder 40 outputs a second control signal.

The decoder 40 is coupled to the processor 60 via the first cable 41, and then the decoder 40 provides the absolute angle signal, the first control signal, and the second control signal to the processor 60 via the first cable 41. In addition, the decoder is coupled to the processor 60 via the second cable 43, and then the decoder 40 provides the incremental angle signal to the processor 60 via the second cable 43. In at least one embodiment, the first cable 41 and the second cable 43 are coupled to different ports of the processor 60, to avoid signal interference.

Furthermore, the decoder 40 outputs a verification code to the processor 60 via the first cable 41 to verify whether a communication between the first cable 41 and the processor 60 is normal.

The sensor 50 is coupled between the motor 200 and the processor 60. The sensor 50 senses a current of the motor 200 and estimates a positioning angle of the rotor 220 according to the current. Thus, the sensor 50 provides an estimated angle signal in relation to the positioning angle of the rotor 220 to the processor 60. In at least one embodiment, the number of the sensor 50 is two, and the two sensors 50 are disposed on two power supply cables wired to the motor 200.

The processor 60 pre-stores an estimated angle program, an incremental angle program, and an absolute angle program. The processor 60 is coupled to the motor driver 20 to change the three phase alternating current (AC) signal from the motor driver 20 by executing the estimated angle program, the incremental angle program, or the absolute angle program. In detail, when the processor 60 receives the first control signal from the decoder 40, the processor 60 executes the estimated angle program associated with the estimated angle signal from the sensor 50. When the processor 60 receives the second control signal from the decoder 40, the processor 60 compares the verification code from the decoder 40 with a predetermined code. If the verification code is not identical with the predetermined code, the processor 60 determines that the communication between the first cable 41 and the processor 60 is abnormal and executes the incremental angle program associated with the incremental angle signal from the second cable 43. If the verification code is identical with the predetermined code, the processor 60 determines that the communication between the first cable 41 and the processor 60 is normal and executes the absolute angle program associated with the absolute angle signal from the first cable 41.

In addition, the processor 60 is coupled to the indication unit 70 to enable the indication unit 70 to function when the processor 60 receives the first control signal from the decoder 40 or the verification code is not identical with the predetermined code. In at least one embodiment, the indication unit 70 can be a buzzer or a light emitting diode (LED).

Figure 2:
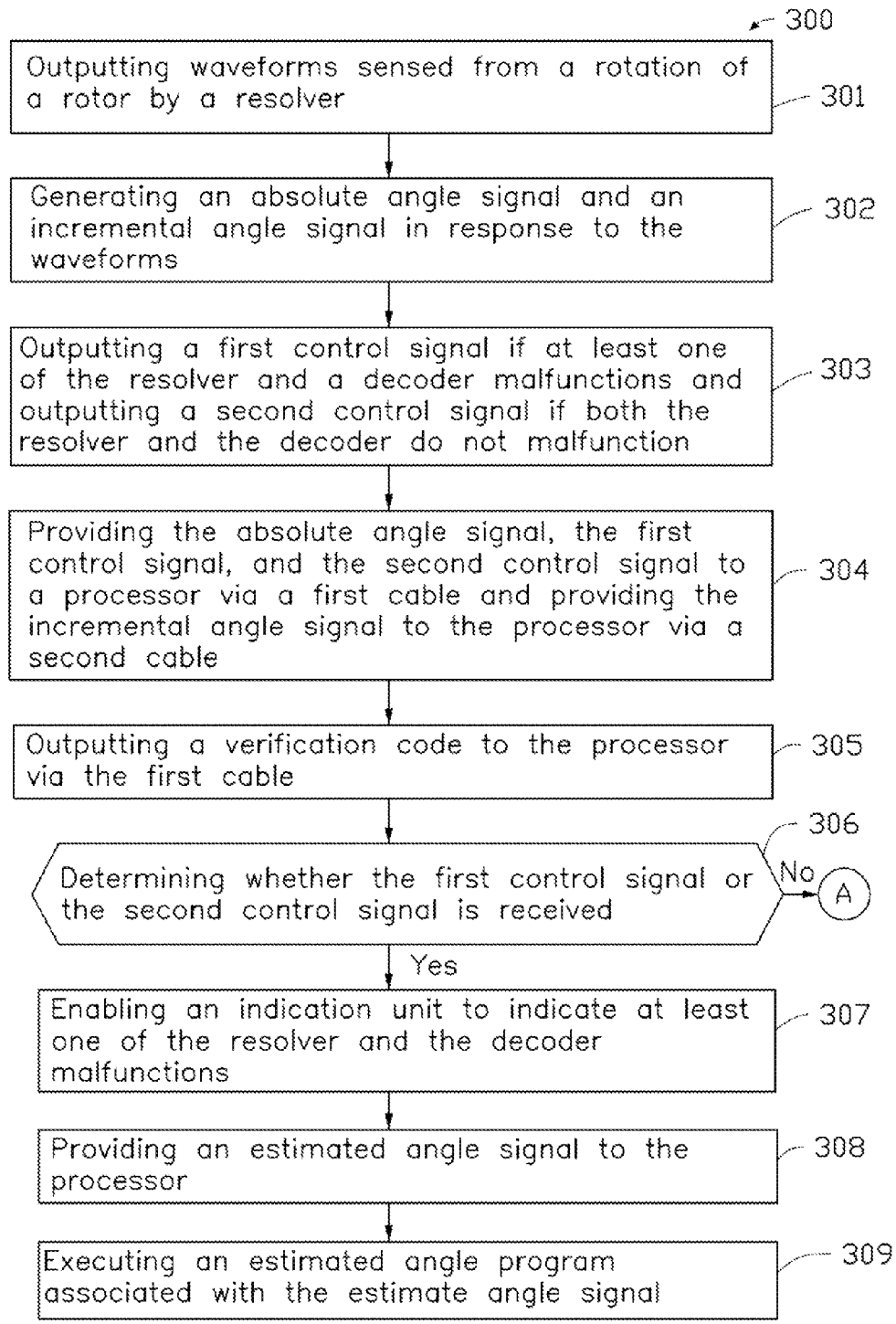
FIG. 2 is a first portion of a flowchart of one embodiment of a control method for a motor using the control apparatus of FIG. 1.
Figure 3:
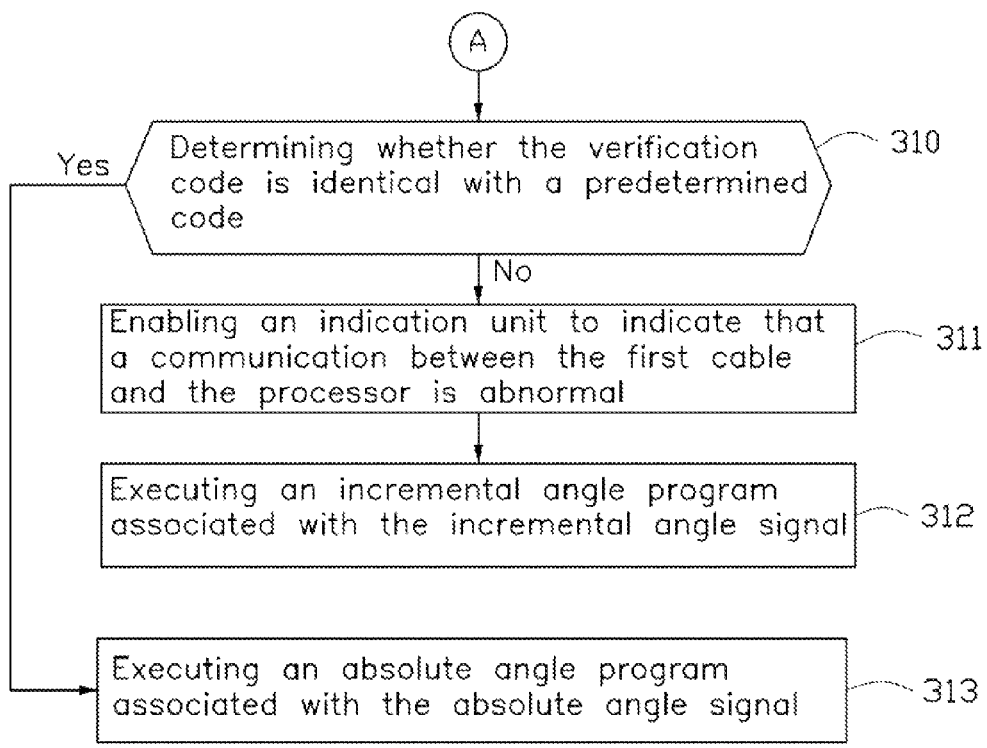
FIG. 3 is a second portion of the flowchart of the control method of FIG. 2.

FIG. 2 illustrates a first portion of a flowchart of an example control method 300 of the disclosure, and FIG. 3 illustrates a second portion of the flowchart of the example control method 300. The control method 300 is provided by way of example, as there are a variety of ways to carry out the control method 300. The control method 300 described below can be carried out using the functional units of the control apparatus 100 as illustrated in FIG. 1, for example, and various elements of this figure are referenced in explaining the example control method 300. Each block shown in FIG. 2 represents one or more processes, methods, or subroutines which are carried out in the example control method 300. Furthermore, the order of blocks is illustrative only and the order of the blocks can change. Additional blocks can be added or fewer blocks may be utilized without departing from the scope of this disclosure. The example control method 300 can begin at block 301.

At block 301, a resolver outputs amplitude modulation sine and cosine waveforms sensed from a rotation of a rotor of a motor.

At block 302, a decoder generates an absolute angle signal and an incremental angle signal in response to the amplitude modulation sine and cosine waveforms.

At block 303, the decoder determines a malfunction by at least one of the resolver and the decoder, and outputs a first control signal if at least one of the resolver and the decoder is malfunctioning. A second control signal is output if neither the resolver nor the decoder is malfunctioning.

At block 304, the decoder provides the absolute angle signal, the first control signal, and the second control signal to a processor via a first cable, and provides the incremental angle signal to the processor via a second cable.

At block 305, the decoder outputs a verification code to the processor via the first cable.

At block 306, the processor determines whether the first control signal or the second control signal is received. If the first control signal is received by the processor, block 307-309 are implemented. If the second control signal is received by the processor, block 310 is implemented.

At block 307, the processor enables an indication unit to indicate that at least one of the resolver and the decoder is malfunctioning.

At block 308, a sensor estimates a positioning angle of the rotor and provides an estimated angle signal in relation to the positioning angle of the rotor to the processor.

At block 309, the processor executes an estimated angle program associated with the estimated angle signal to change a three phase alternating current (AC) signal from a motor driver to rotate the rotor.

At block 310, the processor determines whether the verification code from the decoder is identical with a predetermined code. If the verification code is not identical with the predetermined code, the processor determines that a communication between the first cable and the processor is abnormal, and block 311-312 are implemented. If the verification code is identical with the predetermined code, the processor determines the communication between the first cable and the processor is normal, and block 313 is implemented.

At block 311, the processor enables an indication unit to indicate that the communication between the first cable and the processor is abnormal.

At block 312, the processor executes an incremental angle program associated with the incremental angle signal from the second cable to change the three phase alternating current (AC) signal from the motor driver to rotate the rotor.

At block 313, the processor executes an absolute angle program associated with the absolute angle signal from the first cable to change the three phase alternating current (AC) signal from the motor driver to rotate the rotor.

In summary, when at least one of the resolver 30 and the decoder 40 is malfunctioning, the processor 60 executes an estimated angle program associated with the estimated angle signal from the sensor 50. When both the resolver 30 and the decoder 40 are working normally, but if the communication between the first cable 41 and the processor 60 is abnormal, the processor 60 executes the incremental angle program associated with the incremental angle signal from the second cable 43; if the communication between the first cable 41 and the processor 60 is normal, the processor 60 executes the absolute angle program associated with the absolute angle signal from the first cable 41. Since the processor 60 can change the three phase alternating current (AC) signal from the motor driver 20 to rotate the rotor 220 according to the estimated angle signal, the incremental angle signal, and the absolute angle signal, thus even if the resolver 30 fails, the sensor 50 can serve as a standby element providing position and speed signals necessary for control of the motor 200. The control apparatus 100 is both efficient and convenient.

The embodiments shown and described above are only examples. Many details are often found in the art such as the other features of the control apparatus and the control method for a motor. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:
1. A control apparatus for a motor having a rotor, the control apparatus comprising:
 a resolver mechanically coupled to the rotor and outputting waveforms sensed from a rotation of the rotor;
 a processor;
 a decoder coupled to the resolver and the processor, the decoder generating an absolute angle signal and an incremental angle signal, in response to the waveforms from the resolver, and providing the absolute angle signal and the incremental angle signal to the processor;

a sensor coupled between the motor and the processor, the sensor estimating a positioning angle of the rotor and providing an estimated angle signal in relation to the positioning angle of the rotor to the processor; and a motor driver coupled to the processor and the motor;

wherein when one of the absolute angle signal, the incremental angle signal, and the estimated angle signal is transmitted to the processor, the processor executes a predetermined program associated with the one of the absolute angle signal, the incremental angle signal, and the estimated angle signal to change a current signal from the motor driver to rotate the rotor;

wherein the decoder determines whether at least one of the resolver and the decoder is malfunctioning, if at least one of the resolver and the decoder is malfunctioning, the decoder outputs a first control signal, if neither the resolver nor the decoder is malfunctioning, the decoder outputs a second control signal.

2. The control apparatus as claimed in claim 1, further comprising a first cable connected between the decoder and the processor, wherein the decoder provides the absolute angle signal, the first control signal, and the second control signal to the processor via the first cable.

3. The control apparatus as claimed in claim 2, further comprising a second cable connected between the decoder and the processor, wherein the decoder provides the incremental angle signal to the processor via the second cable.

4. The control apparatus as claimed in claim 3, wherein the decoder outputs a verification code to the processor via the first cable.

5. The control apparatus as claimed in claim 4, wherein the processor compares the verification code from the decoder with a predetermined code to determine whether a communication between the first cable and the processor is normal when the second control signal is transmitted to the processor.

6. The control apparatus as claimed in claim 5, wherein the processor determines the communication between the first cable and the processor is abnormal and executes an incremental angle program associated with the incremental angle signal if the verification code is not identical with the predetermined code.

7. The control apparatus as claimed in claim 6, further comprising an indication unit coupled to the processor, the processor turns on the indication unit when the verification code is not identical with the predetermined code.

8. The control apparatus as claimed in claim 5, wherein the processor determines the communication between the first cable and the processor is normal and executes an absolute angle program associated with the absolute angle signal if the verification code is identical with the predetermined code.

9. The control apparatus as claimed in claim 2, wherein the processor executes an estimated angle program associated with the estimated angle signal when the first control signal is transmitted to the processor.

10. The control apparatus as claimed in claim 9, further comprising an indication unit coupled to the processor, the processor turns on the indication unit when the processor receives the first control signal.

11. A control method for a motor having a rotor, the control method comprising:

outputting, by a resolver, waveforms sensed from a rotation of the rotor by a resolver;

generating, by a decoder, an absolute angle signal and an incremental angle signal in response to the waveforms;

outputting, by a decoder, a first control signal if at least one of the resolver and the decoder is malfunctioning and outputting a second control signal if neither the resolver nor the decoder is malfunctioning;

providing, by the decoder, the absolute angle signal, the first control signal, and the second control signal to a processor via a first cable and providing the incremental angle signal to the processor via a second cable;

outputting, by the decoder, a verification code to the processor via the first cable;

determining, by the processor, whether the first control signal or the second control signal is received;

providing, by a sensor, an estimated angle signal to the processor;

executing, by the processor, an estimated angle program associated with the estimated angle signal to control a motor driver to rotate the rotor the rotor if the first control signal is received by the processor;

determining, by the processor, whether the verification code is identical with a predetermined code if the second control signal is received by the processor;

executing, by the processor, an incremental angle program associated with the incremental angle signal to control the motor driver to rotate the rotor if the verification code is not identical with the predetermined code; and executing, by the processor, an absolute angle program associated with the absolute angle signal to control the motor driver to rotate the rotor if the verification code is identical with the predetermined code.

12. The control method as claimed in claim 11, further comprising enabling, by the processor, an indication unit to indicate at least one of the resolver and the decoder is malfunctioning.

13. The control method as claimed in claim 11, further comprising enabling, by the processor, an indication unit to indicate that a communication between the first cable and the processor is abnormal.

* * * * *